No. 619,192. Patented Feb. 7, 1899.
E. A. LANDON.
LAWN MOWER.
(Application filed Apr. 30, 1898.)
(No Model.)
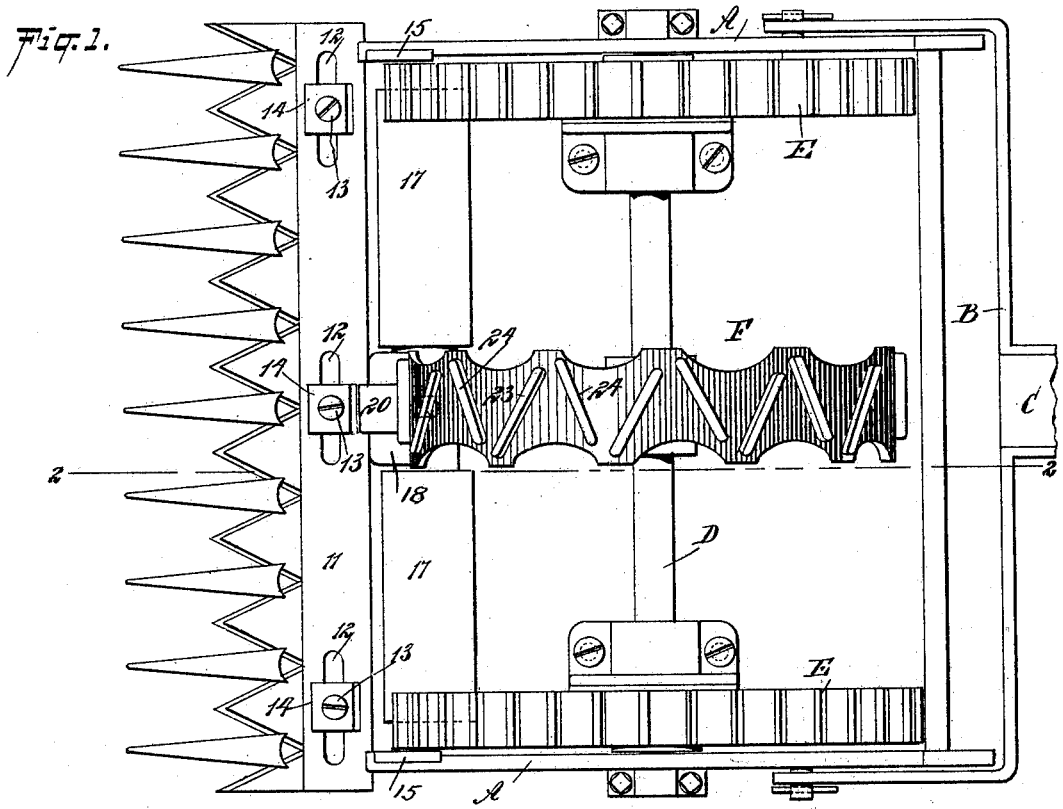
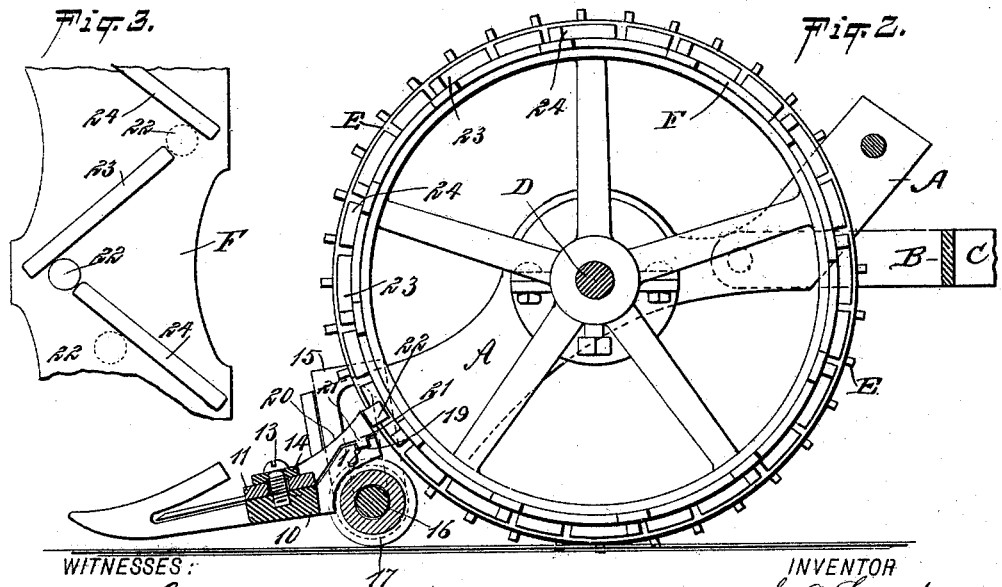
WITNESSES:
INVENTOR
E. A. Landon.
BY
ATTORNEYS.

UNITED STATES PATENT OFFICE.

EDMUND AGUSTUS LANDON, OF PENN YAN, NEW YORK.

LAWN-MOWER.

SPECIFICATION forming part of Letters Patent No. 619,192, dated February 7, 1899.

Application filed April 30, 1898. Serial No. 679,338. (No model.)

*To all whom it may concern:*

Be it known that I, EDMUND AGUSTUS LANDON, of Penn Yan, in the county of Yates and State of New York, have invented a new and Improved Lawn-Mower, of which the following is a full, clear, and exact description.

The object of the invention is to construct a machine which will cut grass and weeds of any height and that will cut close up to a tree or a shrub, a sidewalk, or a fence.

A further object of the invention is to construct a machine in a simple, durable, and economic manner and so that the knife or sickle bar will be moved quickly and uninterruptedly during the whole time the machine is moved forward.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved mower. Fig. 2 is a longitudinal vertical section on the line 2 2 of Fig. 1; and Fig. 3 is an enlarged view of a portion of the periphery of the main driver, illustrating the position of the roller connected with the sickle-bar relative to the cam-ribs on the driver and illustrating also the manner in which the sickle-bar is continuously reciprocated by the action of the ribs of the driver on the roller.

A represents a frame of any approved construction, B a bail connected with the frame, and C a handle connected with the bail.

D represents an axle journaled in the frame, and E the supporting-wheels, which are loosely mounted on the said axle, being provided with the ordinary ratchet connection with the axle.

F represents the driving-wheel for the sickle-bar, which driving-wheel is secured about centrally on the axle. The driving-wheel will be hereinafter particularly described.

A finger-bar 10 is secured to the front lower portion of the frame A, and the knife or sickle bar 11 is held to slide on the finger-bar, and preferably the knife or sickle bar is of greater length than the finger-bar, enabling the knives to cut to advantage when turning corners and also to cut close up to various objects. The sickle or knife bar may be guided in its movement on the finger-bar in any desired manner. As illustrated, however, the knife or sickle bar is provided with a series of longitudinal slots 12, and screws 13 or their equivalents are passed through caps 14, located upon the upper face of the sickle-bar and loosely through the slots 12 and into the finger-bar, as shown in Fig. 2.

A box 15 is adjustably mounted at the forward cheek portions of the frame, the said boxes being adapted to carry a shaft 16, and upon this shaft rollers 17 are mounted to revolve, the rollers being usually two in number, one located at each side of the driver F. A projection 18 is formed at the rear central edge of the finger-bar 10, as shown best in Fig. 2. This projection is given an upward and rearward inclination and is provided near its rear end with a transverse groove 19. An arm 20 is secured to the sickle or knife bar, which arm is fitted loosely upon the extension 18 from the finger-bar, and the arm 20 is provided with a tongue 21, which enters the groove 19 in the said extension of the finger-bar, as is also shown in Fig. 2. A roller 22 is mounted to revolve upon the rear end of the arm 20. The transverse groove 19 and tongue 21 of the rear extensions of the finger-bar and sickle-bar, respectively, provide for the guided movement of one extension upon the other and insure the roller 22 traveling transversely of the driver F.

The driving-wheel F is provided with a series of diagonally-arranged ribs, (designated as 23 and 24,) the ribs being at angles to one another. These ribs do not extend entirely across the peripheral surface of the driving-wheel, as more or less space intervenes between the ends of the ribs and the side edges of the wheel. Alternate ribs incline to the right and the others to the left. A space is provided between adjacent ribs at their converging ends just sufficient to permit the passage between the ribs of the roller 22, the space being also of such dimensions that the roller will not leave one rib until it is in engagement with another.

At the diverging end portions of opposing ribs one end of one of the ribs extends beyond and slightly across the corresponding end of the other rib—as, for example, in selecting three adjacent ribs, as shown in Fig. 3, the right-hand end of the rib 24 extends beyond the corresponding end of the rib 23, whereas the left-hand end of the rib 23 extends beyond the corresponding end of the next rib 24, so that as the drive-wheel is rotated in a forwardly direction the roller will be forced to travel along the peripheral surface of the drive-wheel in engagement with the several ribs, passing from one to the other through the spaces at the converging ends of opposing ribs, as indicated in Fig. 3, and since the roller is in constant engagement with one or the other of the ribs the movement of the sickle or knife bar is continuous or uninterrupted, one rib causing the sickle-bar to move to the right and the next rib causing the sickle-bar to reverse and move to the left.

Having thus described my invention, I claim as new and desire to secure by Letters Patent—

1. In a lawn-mower the combination with a frame, an axle, supporting-wheels carried by the axle, a finger-bar secured to the frame, the said finger-bar being provided with a projection at its rear central edge extending upwardly and rearwardly and formed with a transverse groove, a sickle-bar mounted to slide on the finger-bar, and provided with a series of longitudinal slots, and screws or pins loosely engaging said slots, the sickle-bar having a rearwardly-extending arm provided with a tongue adapted to enter the groove in the projection on the finger-bar, the rear end of said arm being provided with a roller, of a driving-wheel secured on the said axle between the supporting-wheels, the said driving-wheel being provided with a series of diagonally-arranged ribs, adapted to be engaged by the said roller, substantially as described.

2. In a lawn-mower, the combination with a frame, a finger-bar secured to the frame and provided with a rearward extension, a sickle-bar having guided lateral movement on the finger-bar, and a rearwardly-extending arm on the sickle-bar having guided movement on the extension from the finger-bar, and carrying a roller at its rear end, of a driving-wheel provided with means for engaging the said roller, to impart a lateral movement to the sickle-bar, substantially as described.

3. In a lawn-mower, the combination with a frame, an axle, supporting-wheels carried by the axle, a finger-bar having a rearward extension formed with a transverse groove in its upper face, and a sickle-bar having guided lateral movement on the finger-bar and having a rearwardly-extending arm provided with a tongue loosely engaging the transverse groove in the rearward extension of the finger-bar, the said arm carrying a roller, of a driving-wheel provided with cam-ribs adapted to be engaged by the said roller, substantially as described.

EDMUND AGUSTUS LANDON.

Witnesses:
ROY A. BRUCE,
C. EUGENE SHEPARD.